(12) United States Patent
Sakane

(10) Patent No.: US 9,998,630 B2
(45) Date of Patent: Jun. 12, 2018

(54) IMAGE READING DEVICE AND METHOD, AND IMAGE FORMING APPARATUS, WITH PIXEL VALUE CORRECTION BASED ON ESTIMATED IMAGE DATA OF NON-READING REGION

(71) Applicant: KYOCERA Document Solutions Inc., Osaka-shi, Osaka (JP)

(72) Inventor: Hiroki Sakane, Osaka (JP)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 0 days. days.

(21) Appl. No.: 15/473,461

(22) Filed: Mar. 29, 2017

(65) Prior Publication Data
US 2017/0289406 A1 Oct. 5, 2017

(30) Foreign Application Priority Data

Mar. 31, 2016 (JP) ................................. 2016-073046

(51) Int. Cl.
*H04N 1/60* (2006.01)
*H04N 1/58* (2006.01)
(Continued)

(52) U.S. Cl.
CPC ....... *H04N 1/6008* (2013.01); *H04N 1/00013* (2013.01); *H04N 1/00018* (2013.01); *H04N 1/00023* (2013.01); *H04N 1/00068* (2013.01); *H04N 1/00082* (2013.01); *H04N 1/00411* (2013.01); *H04N 1/02845* (2013.01); *H04N 1/121* (2013.01); *H04N 1/193* (2013.01);
(Continued)

(58) Field of Classification Search
CPC .......... H04N 1/00013; H04N 1/00018; H04N 1/00023; H04N 1/00068; H04N 1/00082; H04N 1/00411; H04N 1/193; H04N 1/58; H04N 1/60; H04N 1/6002; H04N 1/6008; H04N 1/603; H04N 1/6083
See application file for complete search history.

(56) References Cited

U.S. PATENT DOCUMENTS 8,118,217 B1 * 2/2012 Ma .................... G06Q 40/02
235/379
8,363,294 B2 * 1/2013 Kim ...................... H04N 1/401
358/1.16
(Continued)

FOREIGN PATENT DOCUMENTS

JP 2013131861 A 7/2013

*Primary Examiner* — Scott A Rogers
(74) *Attorney, Agent, or Firm* — Alleman Hall Creasman & Tuttle LLP

(57) ABSTRACT

An estimated image data calculator is configured to calculate, as estimated image data, for each of image data of respective colors outputted from an imaging element, on the basis of a pixel value of a first pixel on one of two lines adjacent to each other in the image data, and a pixel value of a second pixel on the other of the two lines and adjacent to the first pixel, image data of a non-reading region between a reading region in a document corresponding to the one of the two lines and a reading region in the document corresponding to the other of the two lines. A pixel value correcting unit is configured to correct at least one of the pixel value of the first pixel and the pixel value of the second pixel on the basis of the estimated image data.

7 Claims, 8 Drawing Sheets

(51) Int. Cl.
*H04N 1/00* (2006.01)
*H04N 1/028* (2006.01)
*H04N 1/12* (2006.01)
*H04N 1/193* (2006.01)

(52) U.S. Cl.
CPC ............ *H04N 1/58* (2013.01); *H04N 1/6002* (2013.01); *H04N 1/603* (2013.01); *H04N 1/6083* (2013.01); *H04N 2201/0094* (2013.01)

(56) References Cited

U.S. PATENT DOCUMENTS

| | | | |
|---|---|---|---|
| 8,717,649 B2* | 5/2014 | Kim | H04N 1/401 |
| | | | 358/1.16 |
| 2004/0257600 A1* | 12/2004 | Hiromatsu | H04N 1/58 |
| | | | 358/1.9 |
| 2011/0038020 A1* | 2/2011 | Kagawa | H04N 1/58 |
| | | | 358/505 |
| 2017/0142292 A1* | 5/2017 | Shimizu | H04N 1/484 |
| 2017/0331983 A1* | 11/2017 | Ishido | H04N 1/0464 |

* cited by examiner

IMAGE READING DEVICE AND METHOD, AND IMAGE FORMING APPARATUS, WITH PIXEL VALUE CORRECTION BASED ON ESTIMATED IMAGE DATA OF NON-READING REGION

INCORPORATION BY REFERENCE

This application is based upon and claims the benefit of priority from the corresponding Japanese Patent Application No. 2016-073046 filed on Mar. 31, 2016, the entire contents of which are incorporated herein by reference.

BACKGROUND

The present disclosure relates to an image reading device, an image forming apparatus including the same, and an image reading method.

Generally, there is known a light source switching type image reading device that obtains color image data by sequentially lighting light sources (LED, or the like) of three colors corresponding to R (red), G (green), and B (blue) and by reading, at that time, light data received by a line sensor as R data, G data, and B data, respectively.

In the light source switching type image reading device, since image data of respective colors are read while a document and the line sensor are relatively moved in a sub-scanning direction at a constant speed, the reading positions of the respective colors in the document do not coincide and are shifted in the sub-scanning direction. As a result, for example, each color is sometimes different from that in the document at, for example, a boundary portion of the color. Under such circumstances, there is known an image reading device that is able to correct such a color shift by correcting the image data of the respective colors that are read.

SUMMARY

An image reading device according to one aspect of the present disclosure is provided with a light source, an imaging element, a scanner, an estimated image data calculator, and a pixel value correcting unit. The light source is configured to sequentially radiate different colors of light to a document. The imaging element is configured to receive reflected light from a linear reading region, in the document, extending in a main scanning direction, and sequentially output image data of respective colors. The scanner is configured to move the reading region in the document in a sub-scanning direction. The estimated image data calculator is configured to calculate, as estimated image data, for each of the image data of respective colors outputted from the imaging element, on the basis of a pixel value of a first pixel on one of two lines adjacent to each other in the image data, and a pixel value of a second pixel on the other of the two lines and adjacent to the first pixel, image data of a non-reading region between a reading region in the document corresponding to the one of the two lines and a reading region in the document corresponding to the other of the two lines. The pixel value correcting unit is configured to correct at least one of the pixel value of the first pixel and the pixel value of the second pixel on the basis of the estimated image data.

An image forming apparatus according to another aspect of the present disclosure includes: the image reading device; and an image forming unit configured to form an image on a sheet on the basis of image data outputted from the image reading device.

An image reading method according to another aspect of the present disclosure is executed in an image reading device that includes: a light source configured to sequentially radiate different colors of light to a document; an imaging element configured to receive reflected light from a linear reading region, in the document, extending in a main scanning direction, and sequentially output image data of respective colors; and a scanner configured to move the reading region in the document in a sub-scanning direction, and the image reading method includes an estimated image data calculation step and a pixel value correction step. In the estimated image data calculation step, for each of the image data of respective colors outputted from the imaging element, on the basis of a pixel value of a first pixel on one of two lines adjacent to each other in the image data, and a pixel value of a second pixel on the other of the two lines and adjacent to the first pixel, image data of a non-reading region between a reading region in the document corresponding to the one of the two lines and a reading region in the document corresponding to the other of the two lines is calculated as estimated image data. In the pixel value correction step, at least one of the pixel value of the first pixel and the pixel value of the second pixel is corrected on the basis of the estimated image data.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described in detail based on the accompanying drawings in order to allow understanding of the present disclosure. It should be noted that the following embodiment is an example embodying the present disclosure and does not limit the technical scope of the present disclosure.

[Schematic Configuration of Image Forming Apparatus 10]

First, the schematic configuration of an image forming apparatus 10 according to an embodiment of the present disclosure will be described with reference to FIGS. 1 to 3. Here, FIG. 2 is a schematic cross-sectional view showing an ADF 1 and an image reading unit 2 of the image forming apparatus 10.

Figure 1:
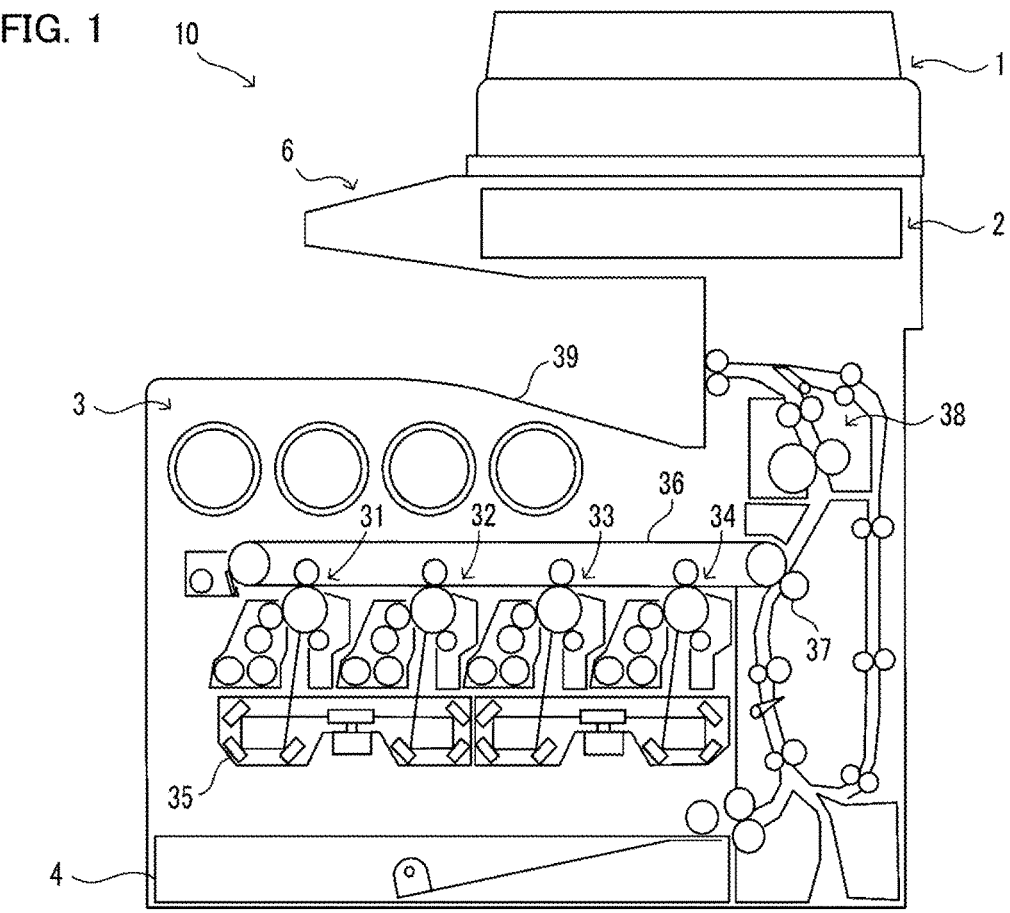
FIG. 1 is a schematic configuration diagram of an image forming apparatus according to an embodiment of the present disclosure.
Figure 2:
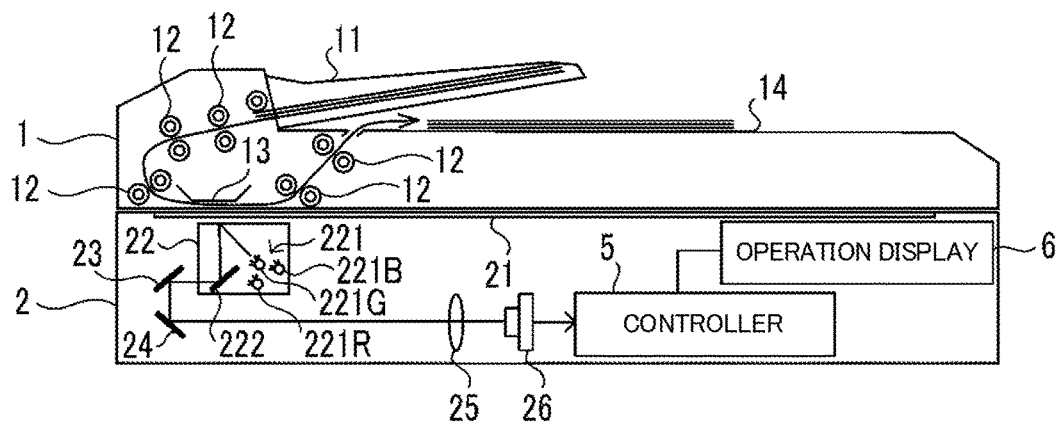
FIG. 2 is a schematic configuration diagram of an ADF and an image reading unit of the image forming apparatus according to the embodiment of the present disclosure.
Figure 3:
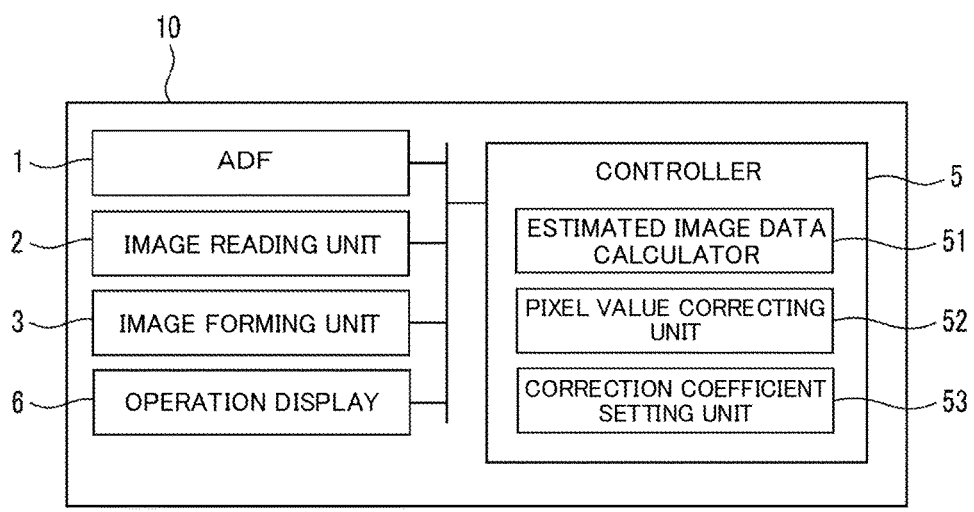
FIG. 3 is a block diagram showing a system configuration of the image forming apparatus according to the embodiment of the present disclosure.

As shown in FIGS. 1 to 3, the image forming apparatus 10 includes the ADF 1, the image reading unit 2, an image forming unit 3, a sheet feed cassette 4, a controller 5, and an operation display 6. The image forming apparatus 10 is a multifunction peripheral having a plurality of functions such as a scanning function to read image data from a document as well as a printing function, a facsimile function, a copy function, or the like. In the image forming apparatus 10, a configuration including the image reading unit 2 and the controller 5 is an example of an image reading device according to the present disclosure. In addition, the present disclosure is applicable to an image reading device or an image forming apparatus, such as a scanner, a facsimile apparatus, and a copy machine.

The image forming unit 3 is an electrophotographic type image forming unit executing an image forming process (printing process) of forming a color or monochrome image on the basis of image data read by the image reading unit 2, or on the basis of image data inputted from an information processing apparatus such as an external personal computer.

Specifically, as shown in FIG. 1, the image forming unit 3 includes a plurality of image forming units 31 to 34, an exposure device (LSU) 35, an intermediate transfer belt 36, a secondary transfer roller 37, a fixing device 38, and a sheet discharge tray 39. The image forming unit 31 is an electrophotographic type image forming unit corresponding to C (cyan), the image forming unit 32 is an electrophotographic type image forming unit corresponding to M (magenta), the image forming unit 33 is an electrophotographic type image forming unit corresponding to Y (yellow), and the image forming unit 34 is an electrophotographic type image forming unit corresponding to K (black). Each of the image forming units 31 to 34 includes a photosensitive drum, a charging device, a developing device, a primary transfer roller, a cleaning device, and the like. The exposure device 35 radiates laser light based on image data to each photosensitive drum, thereby forming an electrostatic latent image based on the image data on each photosensitive drum. Then, a toner image for each color developed on the photosensitive drum by the developing device is intermediately transferred onto the intermediate transfer belt 36, and then is transferred onto a sheet (one example of the sheet of the present disclosure) fed from the sheet feed cassette 4, by the secondary transfer roller 37. Thereafter, the toner image transferred onto the sheet is melted and fixed by the fixing device 38, whereby an image is formed on the sheet, and then the sheet is discharged to the sheet discharge tray 39.

As shown in FIG. 2, the ADF 1 (one example of the scanner of the present disclosure) is an automatic document feeder including a document setting unit 11, a plurality of conveyance rollers 12, a document presser 13, and a sheet discharger 14. In the ADF 1, each conveyance roller 12 is driven by a motor (not shown), whereby a document placed on the document setting unit 11 is conveyed through an image data reading position for the image reading unit 2 to the sheet discharger 14. Thus, the image reading unit 2 can read image data from a document conveyed by the ADF 1.

As shown in FIG. 2, the image reading unit 2 includes a document table 21, a reading unit 22, mirrors 23 and 24, an optical lens 25, and a CCD (Charge Coupled Device) 26.

The document table 21 is located on an upper surface of the image reading unit 2, and includes a document placement surface and a conveyance reading surface that are not shown. The document placement surface is a transparent contact glass on which a document as an image data reading target is placed. On the document placement surface, documents with various sizes can be placed in accordance with predetermined placement reference positions. The conveyance reading surface is a conveyance reading glass that allows light radiated from the reading unit 22 to be transmitted to a document conveyed by the ADF 1.

As shown in FIG. 2, the reading unit 22 includes a light source 221 and a mirror 222, and is movable in the sub-scanning direction (horizontal direction in FIG. 2) by an unillustrated movement mechanism (one example of the scanner of the present disclosure) using a drive unit such as a stepping motor.

The light source 221 is an LED light source capable of radiating lights of R (red), G (green), and B (blue). Specifically, the light source 221 includes multiple red LEDs 221R arranged along the main scanning direction (depth direction in FIG. 2), multiple green LEDs 221G arranged along the main scanning direction, and multiple blue LEDs 221B arranged along the main scanning direction. It is noted that the light source 221 may include multiple full-color LEDs arranged along the main scanning direction, whose lights can be switched among R, G, and B.

The light source 221 sequentially radiates different colors of light to a document placed on the document table 21 or a document conveyed by the ADF 1. That is, the light source 221 sequentially lights the LED light sources of the respective colors, whereby sequentially radiating lights of R (red), G (green), and B (blue) to the document.

The mirror 222 reflects, toward the mirror 23, light radiated from the light source 221 and then reflected by the surface of a document. The light reflected by the mirror 222 is guided to the optical lens 15 by the mirrors 23 and 24. The optical lens 25 converges light that has entered thereto from the mirror 24, into the CCD 26 (one example of the imaging element of the present disclosure).

The CCD 26 is an image sensor including a photoelectric conversion element that converts the received light to an electric signal (voltage) corresponding to the amount of the light and outputs the electric signal as image data corresponding to the color of the received light. When light of each color (R, G, and B) is emitted from the light source 221, the CCD 26 receives reflected light from a linear reading region, in the document, extending in the main scanning direction, and sequentially outputs image data (R data, G data, and B data) of respective colors. The position of the reading region in the document is shifted along with movement of the reading unit 22 in the sub-scanning direction, or movement of the document by the ADF 1 in the sub-scanning direction. The image data of each color outputted from the CCD 26 is inputted to the controller 5.

The controller 5 includes control devices such as a CPU, a ROM, a RAM, and an EEPROM that are not shown. The CPU is a processor that executes various kinds of operational processing. The ROM is a nonvolatile storage unit in which information such as a control program for causing the CPU to execute the various kinds of processing is previously stored. The RAM is a volatile storage unit, and the EEPROM is a nonvolatile storage unit. The RAM and the EEPROM are used as a temporary storage area (working area) to be used in the various kinds of processing executed by the CPU. The controller 5 centrally controls the image forming apparatus 10 by executing various kinds of control programs stored in advance in the ROM by using the CPU. The controller 5 may be composed of an electronic circuit such as an integrated circuit (ASIC), or may be a controller provided independently of a main controller that centrally controls the image forming apparatus 10.

Specifically, in the ROM or the EEPROM of the controller 5, an image correction program to cause the CPU to execute image correction processing described below is stored in advance. The image correction program may be stored in a non-transitory computer-readable storage medium such as a CD, a DVD, or a flash memory, and may be read from the storage medium and installed into a storage unit such as the EEPROM of the controller 5.

The operation display 6 includes: a display, such as a liquid crystal display, which displays various kinds of information on the basis of control instructions from the controller 5; and an operation unit, such as a hardware key or a touch panel, which is used for inputting various kinds of information to the controller 5 in accordance with a user operation.

[Operation of Image Forming Apparatus 10]

Figure 4:
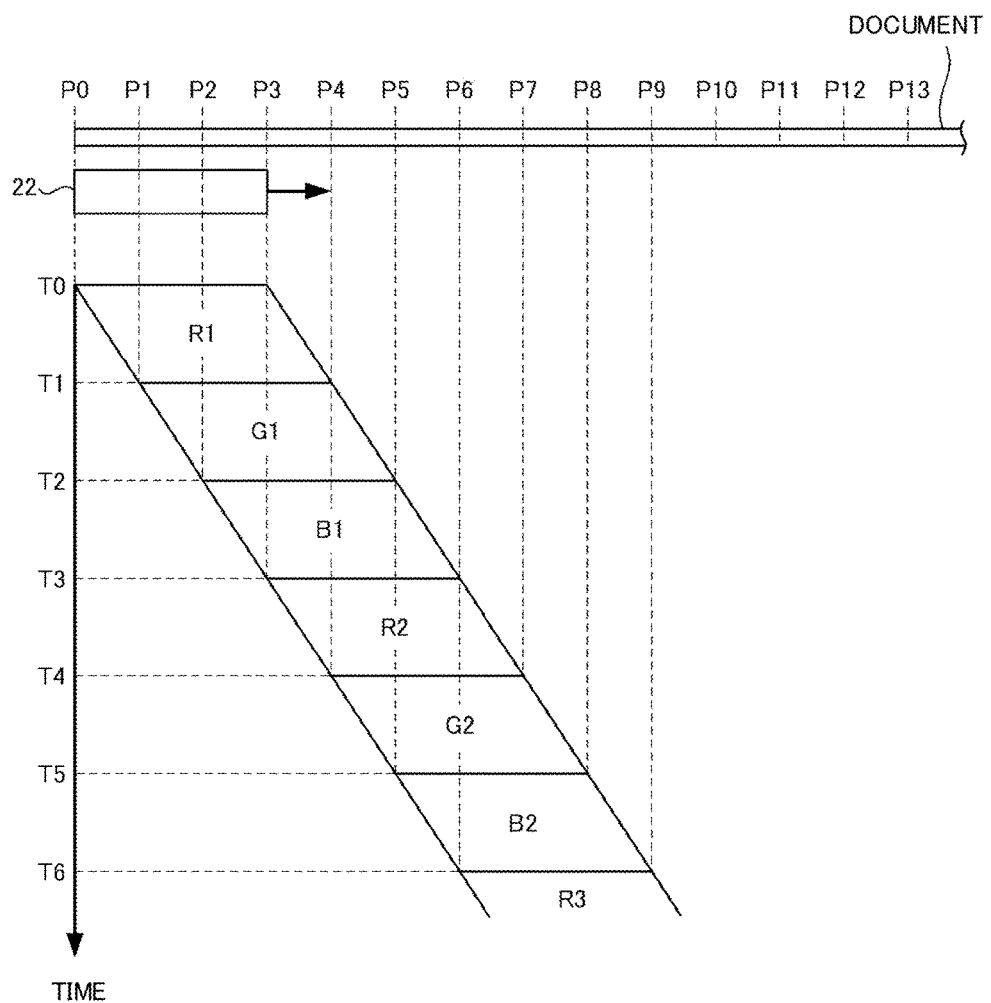
FIG. 4 is a diagram showing temporal change of a reading range in a case where a document is read at a normal reading speed in the image forming apparatus according to the embodiment of the present disclosure.
Figure 5:
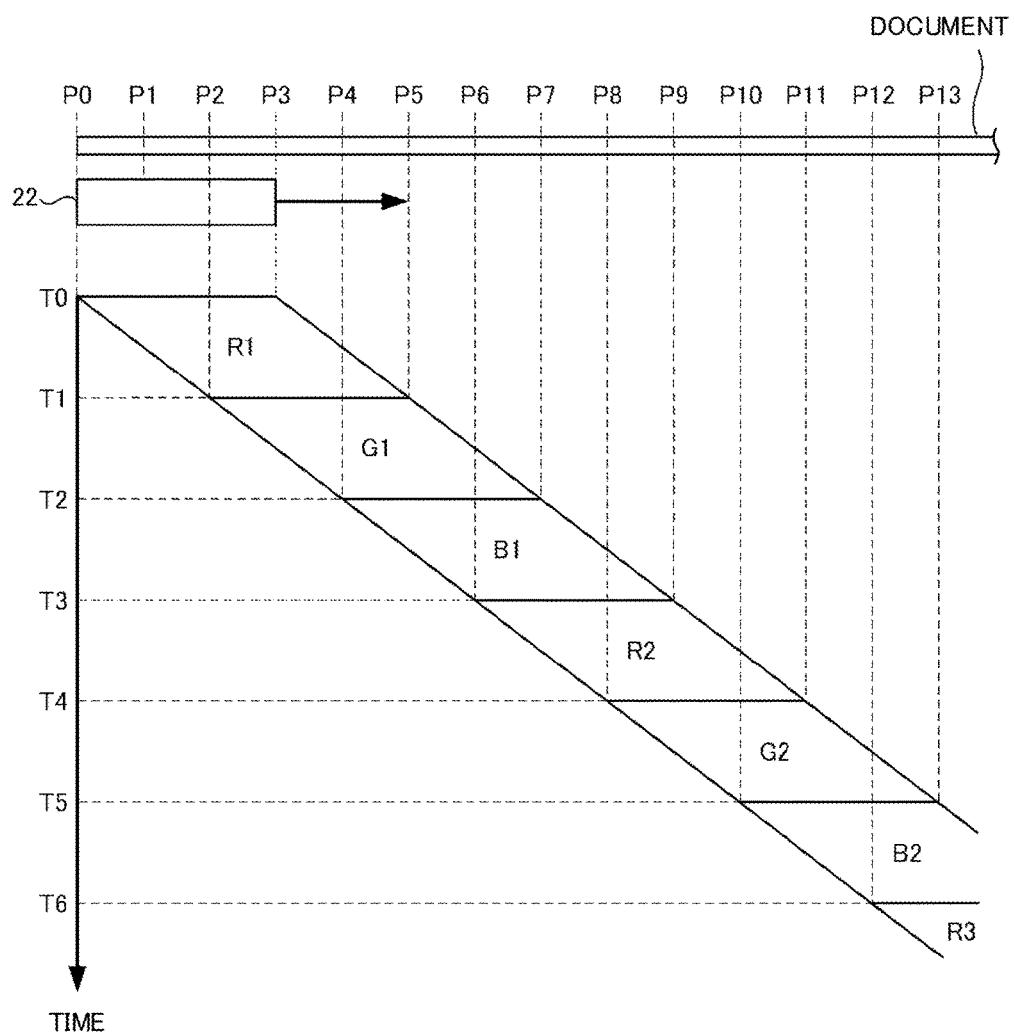
FIG. 5 is a diagram showing temporal change of a reading range in a case where the document is read at a reading speed twice the normal reading speed in the image forming apparatus according to the embodiment of the present disclosure.

Next, the operation of the image forming apparatus 10 will be described with reference to FIGS. 4 to 6.

First, with reference to FIG. 4, the operation of the image forming apparatus 10 in a case where the document is read at the normal reading speed will be described. In FIG. 4, each of positions P0 to P13 shows a position in the sub-scanning direction in the document.

When the document is read at the normal reading speed, the reading unit 22 moves in the sub-scanning direction with respect to the document at a normal speed. At this time, light of each color of R (red), G (green), and B (blue) is radiated from the light source 221 to the document in constant cycles. Specifically, light of R (red) is radiated in a time period T0-T1, light of G (green) is radiated in a time period T1-T2, light of B (blue) is radiated in a time period T2-T3, and the light of R (red) is radiated in a time period T3-T4.

The CCD 26 outputs light received in the time period T0-T1, as image data of a first line corresponding to red (R data of the first line). The CCD 26 outputs light received in the time period T1-T2 as image data of the first line corresponding to green (G data of the first line). The CCD 26 outputs light received in the time period T2-T3 as image data of the first line corresponding to blue (B data of the first line). The CCD 26 outputs light received in the time period T3-T4 as image data of a second line corresponding to red (R data of the second line).

Here, reflected light from a region of positions P0-P3 is received by the CCD 26 at time T0. Since the reading unit 22 moves in the sub-scanning direction with respect to the document at the normal speed, reflected light from a region of positions P1 to P4 is received by the CCD 26 at time T1.

That is, in a case where the document is read at the normal reading speed, the reading region corresponding to R data of the first line outputted from the CCD 26 is a region of positions P0-P4. Similarly, the reading region corresponding to G data of the first line outputted from the CCD 26 is a region of positions P1-P5. The reading region corresponding to B data of the first line outputted from the CCD 26 is a region of positions P2-P6. The reading region corresponding to R data of the second line outputted from the CCD 26 is a region of positions P3-P7.

Here, for example, when attention is focused only on R data, the reading region corresponding to R data of the first line is the region of positions P0-P4. The reading region corresponding to R data of the second line is the region of positions P3-P7. Therefore, there is no non-reading region between the reading region corresponding to R data of the first line and the reading region corresponding to R data of the second line. The same applies to image data of other colors. That is, in a case where the document is read at the normal reading speed, there is no non-reading region. That is, image data of each color outputted from the CCD 26 becomes image data reflecting the images in all the regions in the document.

Next, with reference to FIG. 5, the operation of the image forming apparatus 10 in a case where the document is read at the reading speed twice the normal reading speed will be described.

In a case where the document is read at the reading speed twice the normal reading speed, the reading unit 22 moves in the sub-scanning direction with respect to the document at a speed twice the normal speed. Also in this case, light of each color of R (red), G (green), and B (blue) is radiated from the light source 221 to the document in constant cycles. Specifically, the light of R (red) is radiated in the time period T0-T1, the light of G (green) is radiated in the time period T1-T2, the light of B (blue) is radiated in the time period T2-T3, and the light of R (red) is radiated in the time period T3-T4.

The CCD 26 outputs light received in the time period T0-T1 as image data of the first line corresponding to red (R data of the first line). The CCD 26 outputs light received in the time period T1-T2 as image data of the first line corresponding to green (G data of the first line). The CCD 26 outputs light received in the time period T2-T3 as image data of the first line corresponding to blue (B data of the first line). The CCD 26 outputs light received in the time period T3-T4 as image data of the second line corresponding to red (R data of the second line). As a result, as compared with a case where the document is read at the normal reading speed, the resolution of image data outputted from the CCD 26 in the sub-scanning direction is halved.

Here, reflected light from the region of positions P0-P3 is received by the CCD 26 at the time T0. Since the reading unit 22 moves in the sub-scanning direction with respect to the document at a speed twice the normal speed, reflected light from a region of positions P2-P5 is received by the CCD 26 at the time T1.

That is, in a case where the document is read at the reading speed twice the normal reading speed, the reading region corresponding to R data of the first line outputted from the CCD 26 is a region of positions P0-P5. Similarly, the reading region corresponding to G data of the first line outputted from the CCD 26 is a region of positions P2-P7. The reading region corresponding to B data of the first line outputted from the CCD 26 is a region of positions P4-P9. The reading region corresponding to R data of the second line outputted from the CCD 26 is a region of positions P6-P11.

Here, for example, when attention is focused only on R data, the reading region corresponding to R data of the first line is the region of positions P0-P5. The reading region corresponding to R data of the second line is the region of positions P6-P11. Therefore, there is a non-reading region (here, a region of positions P5-P6) between the reading region corresponding to R data of the first line and the reading region corresponding to R data of the second line. The same applies to image data of other colors. That is, in a case where the document is read at the reading speed twice the normal reading speed, there is the non-reading region. That is, image data of each color outputted from the CCD 26 becomes image data that fails to reflect the images in part of the region (non-reading region) in the document.

Figure 6:
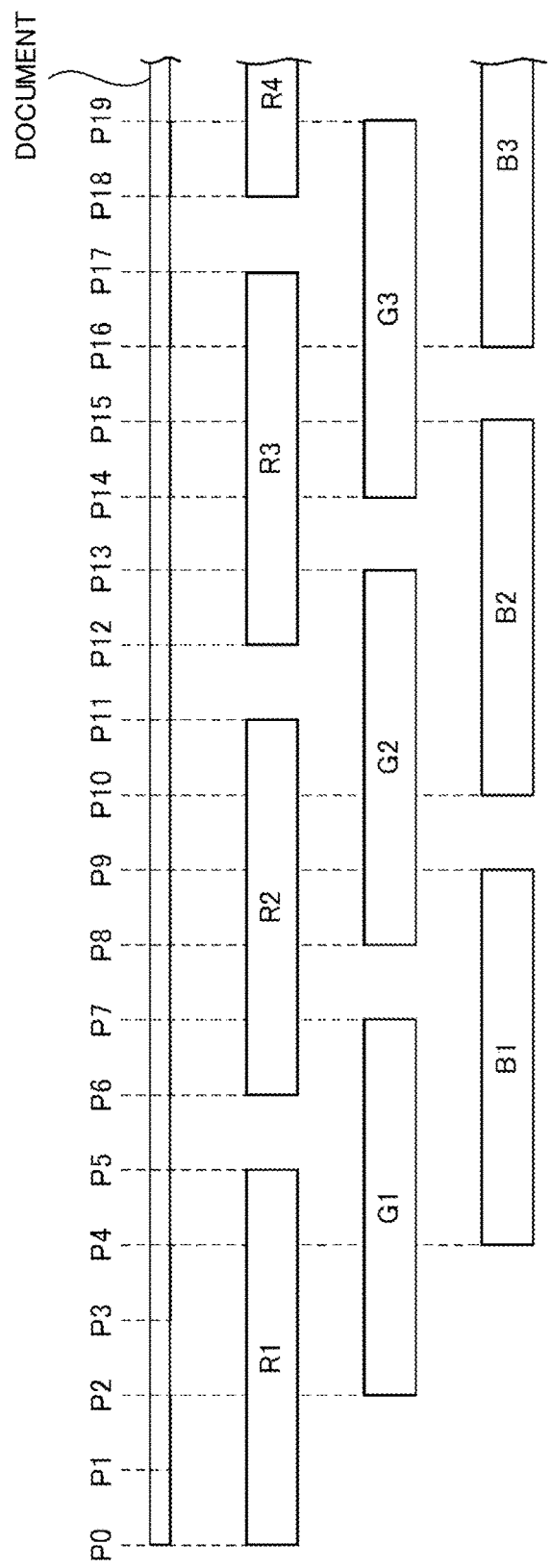
FIG. 6 is a diagram showing reading ranges of lines of respective colors in a case where the document is read at the reading speed twice the normal reading speed in the image forming apparatus according to the embodiment of the present disclosure.

For example, as shown in FIG. 6, the image of the region of positions P5-P6 in the document is reflected in G data of the first line and B data of the first line, but fails to be reflected in R data. Similarly, the image of a region of positions P7-P8 in the document is reflected in B data of the first line and R data of the second line, but fails to be reflected in G data. The image of a region of positions P9-P10 in the document is reflected in R data of the second line and G data of the second line, but fails to be reflected in B data. The image of a region of positions P11-P12 in the document is reflected in G data of the second line and B data of the second line, but fails to be reflected in R data.

As described above, in a case where the document reading speed is increased in the light source switching method, a region in which an image cannot be read in the document (non-reading region) occurs. This non-reading region becomes a position that is different for every color. As a result, for example, the non-reading region regarding R data contains only G data and B data. Similarly, the non-reading region regarding G data contains only R data and B data. The non-reading region regarding B data contains only R data and G data. In this situation, colors in the non-reading regions of the document fail to be reflected in image data of the respective colors that have been read. Therefore, when only correction on the color image data of the respective colors that have been read is executed, colors of the color image data after correction are different from the colors in the document.

On the other hand, in the image forming apparatus 10 of the present embodiment, by image correction processing described below being executed by the controller 5, it is possible to suppress a reduction in the accuracy of reading colors from the document in a case where the document reading speed is increased in the light source switching method. Hereinafter, the image correction processing being executed by the controller 5 will be described in further detail.

[Image Correction Processing]

As shown in FIG. 3, the controller 5 includes an estimated image data calculator 51, a pixel value correcting unit 52, and a correction coefficient setting unit 53. The controller 5 causes the CPU to execute the image correction program stored in the ROM, thereby functioning as the estimated image data calculator 51, the pixel value correcting unit 52, and the correction coefficient setting unit 53. In addition, some or all of the estimated image data calculator 51, the pixel value correcting unit 52, and the correction coefficient setting unit 53 may be electric circuit modules.

The estimated image data calculator 51 calculates, as estimated image data, for each of the image data (R data, G data, and B data) of the respective colors outputted from the CCD 26, on the basis of a pixel value of a pixel (hereinafter, referred to as a first pixel) on one of two lines adjacent to each other in the image data and a pixel value of a pixel (hereinafter, referred to as a second pixel) on the other of the two lines and adjacent to the first pixel, image data of a non-reading region between a reading region in the document corresponding to the one of the two lines and a reading region in the document corresponding to the other of the two lines.

R data, as shown in FIG. 6, will be described in details The estimated image data calculator 51 calculates estimated image data of a non-reading region of positions P5-P6, on the basis of the pixel value (R1 in FIG. 6) of the first pixel on the first line and the pixel value (R2) of the second pixel on the second line and adjacent to the first pixel. Similarly, the estimated image data calculator 51 calculates estimated image data of a non-reading region of positions P11-P12, on the basis of the pixel value (R2) of the first pixel on the second line and the pixel value (R3) of the second pixel on a third line and adjacent to the first pixel. Similarly, the estimated image data calculator 51 calculates estimated image data of a non-reading region of positions P17-P18, on the basis of the pixel value (R3) of the first pixel on the third line and the pixel value (R4) of the second pixel on a fourth line and adjacent to the first pixel.

The calculation regarding R data can be applied to that regarding G data and B data. For example, the estimated image data calculator 51 calculates estimated image data of a non-reading region of positions P7-P8, on the basis of the pixel value (G1) of the first pixel on the first line in G data and the pixel value (G2) of the second pixel on the second line and adjacent to the first pixel in G data. Similarly, the estimated image data calculator 51 calculates estimated image data of a non-reading region of positions P9-P10, on the basis of the pixel value (B1) of the first pixel on the first line in B data and the pixel value (B2) of the second pixel on the second line and adjacent to the first pixel in B data.

For example, the estimated image data calculator 51 may calculate the estimated image data by linear interpolation on the basis of the pixel value of the first pixel and the pixel value of the second pixel. More specifically, the estimated image data calculator 51 may calculate, as the estimated image data, an average value between the pixel value of the first pixel and the pixel value of the second pixel.

The pixel value correcting unit 52 corrects at least one of the pixel value of the first pixel and the pixel value of the second pixel, on the basis of the estimated image data calculated by the estimated image data calculator 51. Specifically, the pixel value correcting unit 52 corrects at least one of the pixel value of the first pixel and the pixel value of the second pixel so that the value approximates to the estimated image data. For example, the pixel value correcting unit 52 may correct the pixel value of the first pixel so that the value approximates to the estimated image data, by a value obtained by multiplying a difference between the pixel value of the first pixel and the estimated image data by a predetermined correction coefficient (for example, "0.5"). The same applies to the pixel value of the second pixel.

The correction coefficient setting unit 53 sets the correction coefficient used in the pixel value correcting unit 52. For example, the correction coefficient setting unit 53 may set a fixed value stored in advance in the ROM, or the like, as the correction coefficient, or may set the correction coefficient in accordance with a user operation.

Furthermore, the correction coefficient setting unit 53 may set the correction coefficient in accordance with the document reading speed, and the like. For example, the correction coefficient setting unit 53 may set the correction coefficient in accordance with the ratio of the size of the reading region in the document corresponding to each line of image data to the size of the non-reading region. For example, in the example of FIGS. 5 and 6, the ratio of the size of the reading region to the size of the non-reading region is 5:1. For example, the correction coefficient setting unit 53 may set, as the correction coefficient, the ratio ("0.17" in the example of FIGS. 5 and 6) of the size of the non-reading region to the size of the reading region.

Figure 7:
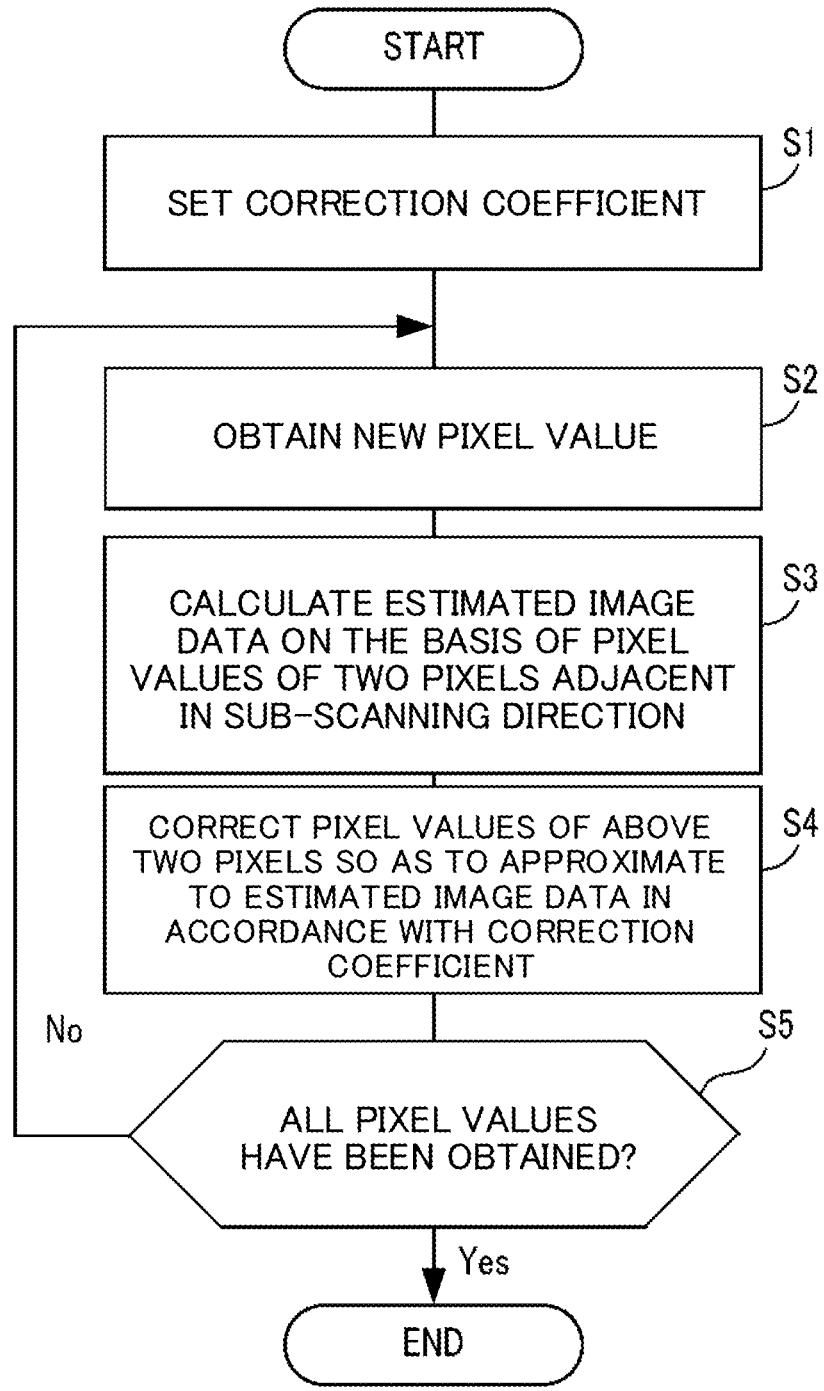
FIG. 7 is a flowchart showing a flow of image correction processing executed in the image forming apparatus according to the embodiment of the present disclosure.

Hereinafter, an example of a procedure of the image correction processing executed by the controller 5 in the image forming apparatus 10 will be described with reference to FIG. 7. Here, S1, S2 . . . represent numbers of processing procedures (steps) executed by the controller 5. The image correction processing, as shown in FIG. 7, is executed in parallel with the output of image data of each color from the CCD 26. Here, in order to simplify the description, the image correction processing on R data will be only described. However, the same image correction processing as that on R data is executed on G data and B data.

<Step S1>

First, in step S1, the controller 5 sets the correction coefficient. Here, the controller 5 sets the correction coefficient at "0.5". As another example, the controller 5 may set the correction coefficient in accordance with a user operation as described above, or may automatically set the correction coefficient in accordance with the document reading speed, or the like.

<Step S2>

In step S2, the controller 5 obtains the pixel value of a new pixel in R data from the CCD 26.

<Step S3>

In step S3, the controller 5 calculates estimated image data on the basis of the pixel values of two pixels adjacent to each other in the sub-scanning direction (that is, the new pixel obtained in step S2 and a pixel on the immediately previous line and adjacent to the new pixel).

Figure 8:
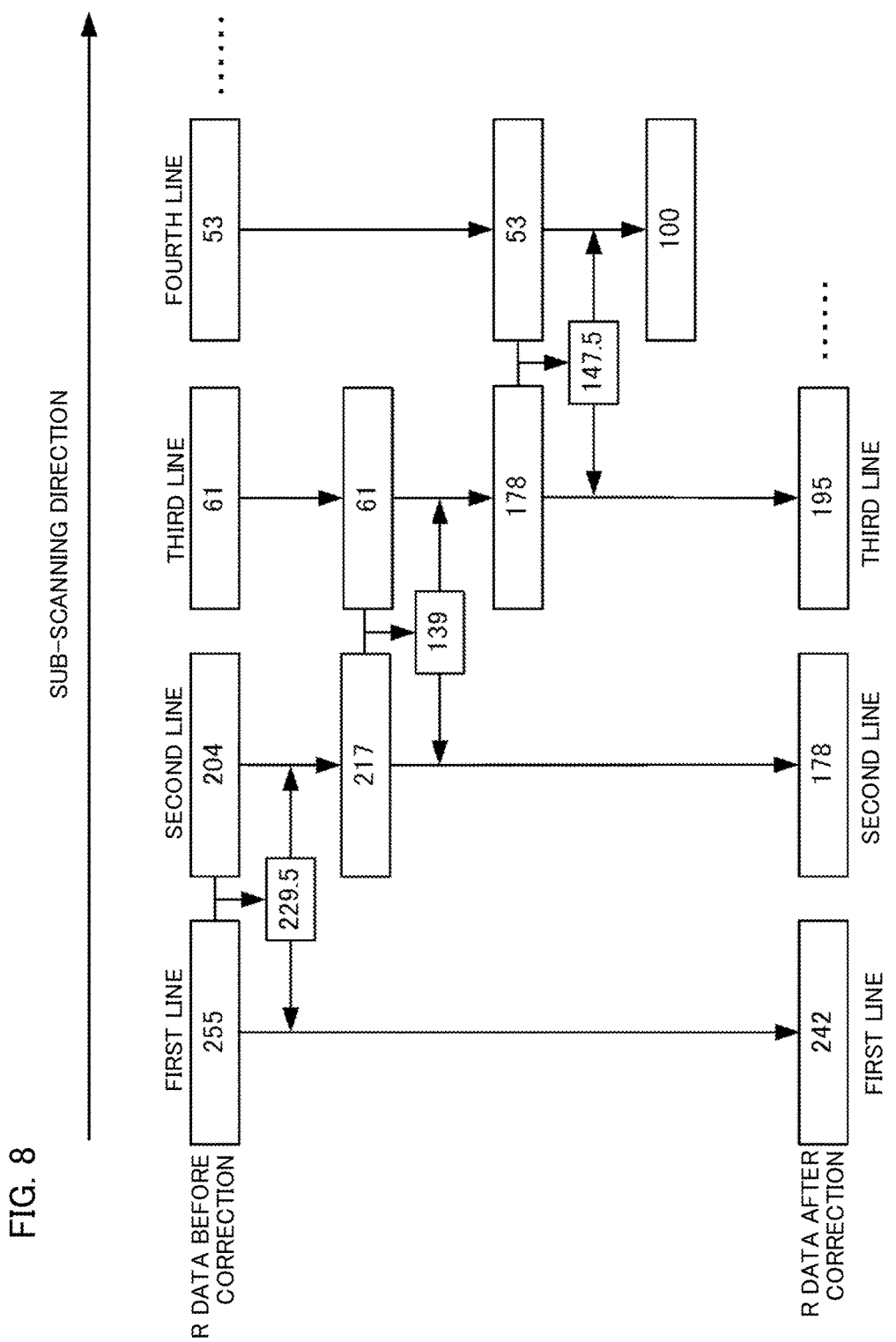
FIG. 8 is a diagram showing a specific example of the image correction processing executed in the image forming apparatus according to the embodiment of the present disclosure.

For example, if the new pixel obtained in step S2 is the pixel on the second line as shown in FIG. 8, the controller 5 calculates the estimated image data on the basis of a pixel value "255" of the pixel on the first line and a pixel value "204" of the pixel on the second line. In the example of FIG. 8, the controller 5 calculates, as the estimated image data, an average value "229.5" between the pixel value "255" of the pixel on the first line and the pixel value "204" of the pixel on the second line.

<Step S4>

In step S4, the controller 5 corrects the pixel values of the two pixels (that is, the new pixel obtained in step S2 and the pixel on the immediately previous line and adjacent to the new pixel) in accordance with the correction coefficient set in step S1, so that the value approximates to the estimated image data calculated in step S3.

For example, if the new pixel obtained in step S2 is the pixel on the second line as shown in FIG. 8, the controller 5 corrects the pixel value of the pixel on the first line, by a value (that is, by "13") obtained by multiplying a difference "25.5" between the pixel value "255" of the pixel on the first line and the estimated image data "229.5" by the correction coefficient "0.5", so that the value approximates to the estimated image data. As a result, the pixel value after the correction of the pixel on the first line becomes "242". Similarly, the controller 5 corrects the pixel value of the pixel on the second line, by a value (that is, by "13") obtained by multiplying a difference "25.5" between the pixel value "204" on the second line and the estimated image data "229.5" by the correction coefficient "0.5", so that the value approximates to the estimated image data. As a result, the pixel value after the correction of the pixel on the second line becomes "217". In the present embodiment, however, the pixel value "217" after the correction of the pixel on the second line will be further corrected at the time when the pixel value of the pixel on the third line has been obtained.

For example, if the new pixel obtained in step S2 is the pixel on the third line as shown in FIG. 8, in the following step S3, the estimated image data "139" is calculated on the basis of the pixel value "217" after the correction of the pixel on the second line and a pixel value "61" of the pixel on the third line. In the following step S4, the pixel value of the pixel on the second line is corrected to "178", and the pixel value of the pixel on the third line is corrected to "178". By subsequently repeating the same processing steps, R data after the correction as shown in FIG. 8 are obtained.

R data before the correction and R data after the correction, as shown in FIG. 8, are parts of pixel groups included in R data (pixel groups in specific lines arranged along the sub-scanning direction). The pixel groups in the other lines are corrected in the same way.

<Step S5>

In step S5, the controller 5 determines whether the pixel values of all the pixels in R data have been obtained. If the controller 5 has determined that the pixel values of all the pixels in R data have been obtained (S5: Yes), the image correction processing is ended. On the other hand, if the controller 5 has determined that the pixel values of all the pixels in R data are not obtained (S5: No), the processing returns to step S2.

The processing of step S1 (correction coefficient setting step) is executed by the correction coefficient setting unit 53. The processing of step S3 (estimated image data calculation step) is executed by the estimated image data calculator 51. The processing of step S4 (pixel value correction step) is executed by the pixel value correcting unit 52.

As described above, according to the present embodiment, the estimated image data of the non-reading regions are calculated, and the pixel values of image data are corrected on the basis of the estimated image data. Therefore, it is possible to suppress a reduction in the accuracy of reading colors from the document in a case where the document reading speed is increased in the light source switching method.

Figure 9:
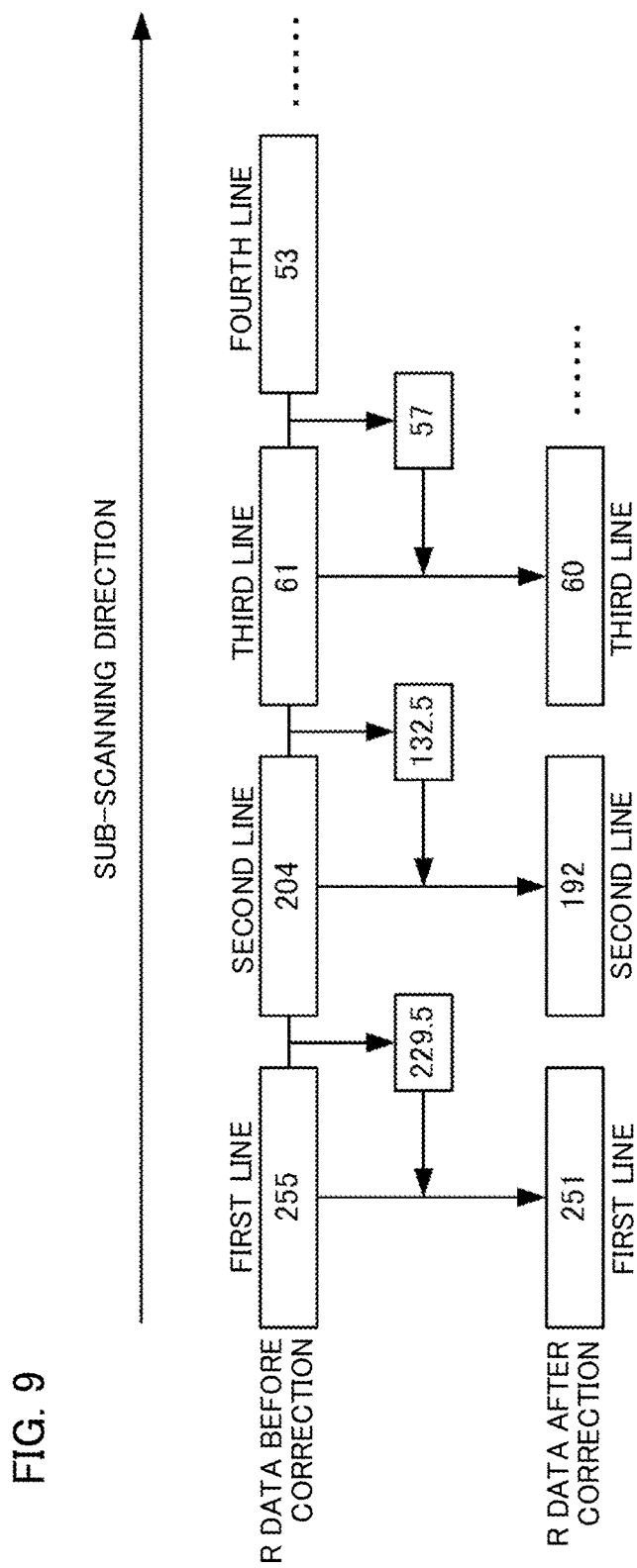
FIG. 9 is a diagram showing another specific example of the image correction processing executed in the image forming apparatus according to the embodiment of the present disclosure.

In step S4 of the flowchart of FIG. 7, the pixel values of both the two pixels (that is, the new pixel obtained in step S2 and the pixel on the immediately previous line and adjacent to the new pixel) are corrected. However, the present disclosure is not limited thereto. In another embodiment, for example, as shown in FIG. 9, only one of the two pixel values may be corrected. For example, in the example of FIG. 9, as in the example of FIG. 8, the estimated image data "229.5" is calculated on the basis of the pixel value "255" of the pixel on the first line and the pixel value "204" of the pixel on the second line. Then, only the pixel value of the pixel on the first line is corrected on the basis of the calculated estimated image data. Specifically, the controller 5 corrects only the pixel value of the pixel on the first line by a value (that is by, "4") obtained by multiplying a difference "25.5" between the pixel value "255" of the pixel on the first line and the estimated image data "229.5" by a correction coefficient (for example, 0.17 that is a value corresponding to the ratio of the non-reading region to the reading region), so that the value approximates to the estimated image data. As a result, the pixel value after the correction of the pixel on the first line becomes "251". The same applies to the pixels on the second line and the following lines.

In the flowchart of FIG. 7, the image correction processing is executed in parallel with the output of image data of each color from the CCD 26. However, the present disclosure is not limited thereto. In another embodiment, the image correction processing may be executed after all the image data of the respective colors are outputted from the CCD 26.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
    a light source configured to sequentially radiate different colors of light to a document;
    an imaging element configured to receive reflected light from a linear reading region, in the document, extending in a main scanning direction, and sequentially output image data of respective colors;
    a scanner configured to move the reading region in the document in a sub-scanning direction;
    an estimated image data calculator configured to calculate, as estimated image data, for each of the image data of respective colors outputted from the imaging element, on the basis of a pixel value of a first pixel on one of two lines adjacent to each other in the image data, and a pixel value of a second pixel on the other of the two lines and adjacent to the first pixel, image data of a non-reading region between a reading region in the document corresponding to the one of the two lines and a reading region in the document corresponding to the other of the two lines; and
    a pixel value correcting unit configured to correct at least one of the pixel value of the first pixel and the pixel value of the second pixel on the basis of the estimated image data.

2. The image reading device according to claim 1, wherein the estimated image data calculator calculates, as the estimated image data, an average value between the pixel value of the first pixel and the pixel value of the second pixel.

3. The image reading device according to claim 1, wherein the pixel value correcting unit corrects at least one of the pixel value of the first pixel and the pixel value of the second pixel, so that the value approximates to the estimated image data.

4. The image reading device according to claim 3, wherein the pixel value correcting unit corrects the pixel value of the first pixel, by a value obtained by multiplying a difference between the pixel value of the first pixel and the estimated image data by a predetermined correction coefficient, so that the value approximates to the estimated image data.

5. The image reading device according to claim 4, further comprising a correction coefficient setting unit configured to set the correction coefficient in accordance with a ratio of a size of a reading region in the document corresponding to each line of the image data to a size of the non-reading region.

6. An image forming apparatus comprising:
    the image reading device according to claim 1; and
    an image forming unit configured to form an image on a sheet on the basis of image data outputted from the image reading device.

7. An image reading method being executed in an image reading device that includes: a light source configured to sequentially radiate different colors of light to a document; an imaging element configured to receive reflected light from a linear reading region, in the document, extending in a main scanning direction, and sequentially output image data of respective colors; and a scanner configured to move the reading region in the document in a sub-scanning direction, the image reading method comprising:
    an estimated image data calculation step of calculating, as estimated image data, for each of the image data of respective colors outputted from the imaging element, on the basis of a pixel value of a first pixel on one of two lines adjacent to each other in the image data, and a pixel value of a second pixel on the other of the two lines and adjacent to the first pixel, image data of a non-reading region between a reading region in the document corresponding to the one of the two lines and a reading region in the document corresponding to the other of the two lines; and
    a pixel value correction step of correcting at least one of the pixel value of the first pixel and the pixel value of the second pixel on the basis of the estimated image data.

* * * * *